April 25, 1961     R. G. CARRICO     2,981,404

LUNETTE

Filed March 14, 1960                                                 2 Sheets-Sheet 1

INVENTOR.
ROBERT GERVASE CARRICO
BY
Eugene C. Knoblock
ATTORNEY

April 25, 1961  R. G. CARRICO  2,981,404
LUNETTE
Filed March 14, 1960  2 Sheets-Sheet 2
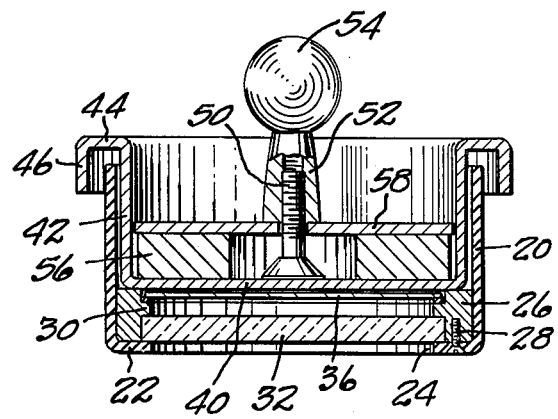
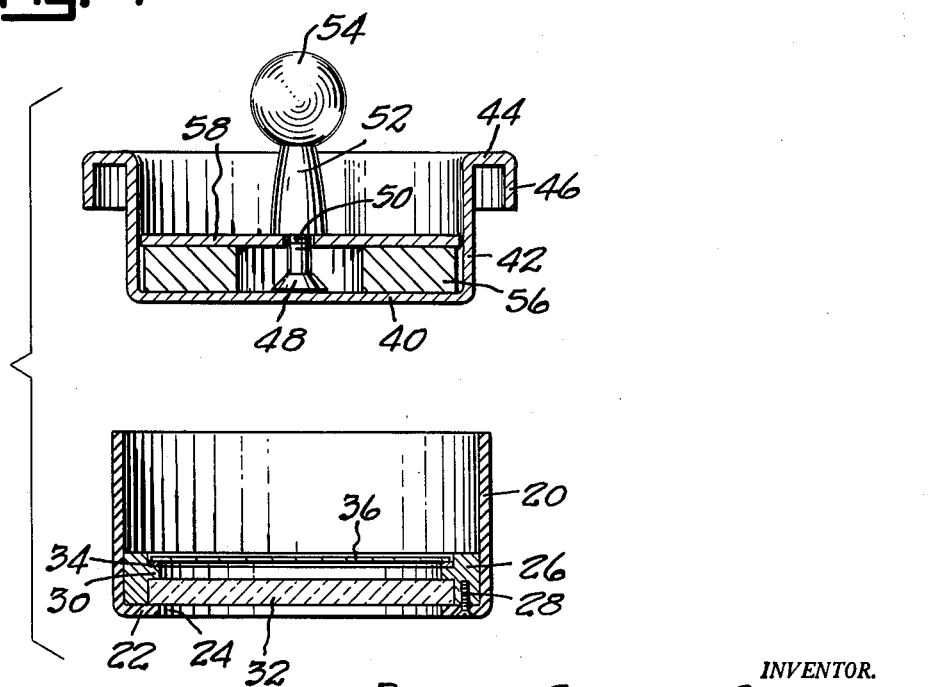
INVENTOR.
ROBERT GERVASE CARRICO
BY
Eugene C. Knoblock
ATTORNEY United States Patent Office 2,981,404
Patented Apr. 25, 1961

2,981,404
LUNETTE
Robert Gervase Carrico, German Township, Marshall County, Ind. (R.R. 1, Bremen, Ind.)
Filed Mar. 14, 1960, Ser. No. 14,632
8 Claims. (Cl. 206—19)

This invention relates to improvements in lunettes used in religious ceremonies to hold the Host as it is transferred between a monstrance and a tabernacle so as to expose it to view while at the same time confining it.

Previous constructions of lunettes have required the use of fastenings for the various parts which constitute it. Such fastenings, such as snap locks, pin and bayonet slots and hinged swivels, require release or manipulation during a ceremony incident to transfer of the lunette.

It is the primary object of this invention to provide a construction of lunette which eliminates the use of fastenings which require manipulation to release them to accommodate separation of the parts of the lunette or to effect interconnection of parts of the lunette incident to assembly thereof.

A further object is to provide a lunette consisting of a tubular body, a lid or cover and a mounting ring, so interrelated that a single magnet holds the parts in operative assembled relation but accommodates removal of the lunette body and cover as a unit from the mounting ring and releasably holds said lunette body and cover to facilitate separation thereof at will.

A further object is to provide a lunette consisting of multiple parts which are releasably assembled and held in operative relation by the use of a single magnet in a manner to accommodate separation and opening thereof in response to a simple pull, which magnet assures a positive closing and assembly of the parts in operative relation when properly interfitted.

A further object is to provide a lunette part mounting a magnet and positionable within a mounting ring characterized by a ferrous body having a non-ferrous end portion to limit magnetic influence between the magnet-carrying part and the ring in certain positions of the lunette part with respect to the ring.

Other objects will be apparent from the following specification.

In the drawings:

Fig. 3 is a sectional view similar to Fig. 1, illustrating the sub-assembly of the parts of the lunette removable from the mounting ring; and Fig. 4 is a sectional view illustrating the parts shown in Fig. 3 in disassembled relation.

Figure 1:
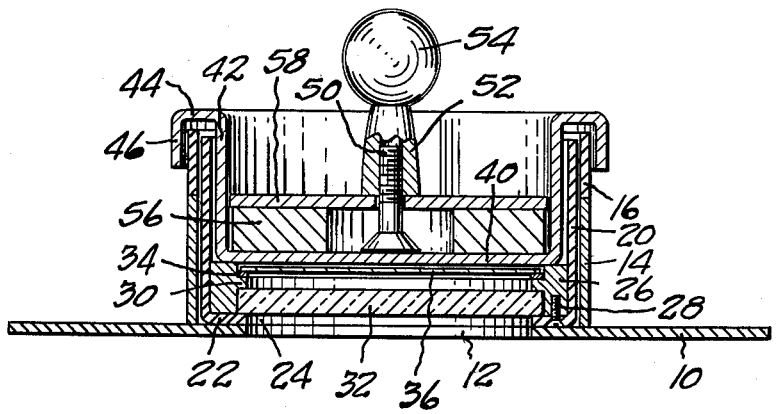
Fig. 1 is a transverse sectional view taken on line 1—1 of Fig. 2 and illustrating the lunette in assembled position within its mounting ring.
Figure 2:
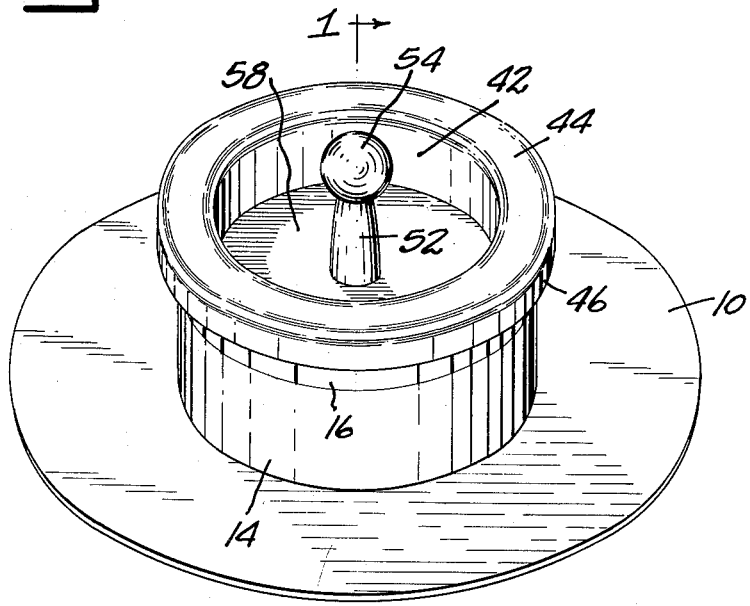
Fig. 2 is a perspective view of the assembled lunette illustrating the same mounted in its mounting ring.

Referring to the drawings which illustrate the preferred embodiment of the invention, the numeral 10 designates the base or mounting flange of a mounting ring. The flange 10 is adapted to be employed for purpose of anchoring the mounting ring on a monstrance (not shown) in a vertical position surrounding an opening in the monstrance. The flange will preferably be formed of bronze or other non-ferrous material which is not susceptible to magnetic attraction, and it has an opening 12 formed centrally thereof. A cylindrical or tubular ferrous metal member or ring 14, preferably having a uniform relatively thin wall section, is suitably secured to the flange 10, as by silver solder. The inner diameter or size of the ring 14 will preferably be greater than the diameter or size of the opening 12, and the ring 14 will preferably be substantially concentric with the opening 12 so that a shoulder is formed within the ring 14 by the portion of the flange 10 immediately surrounding the opening 12. A bronze or other non-ferrous ring 16, which is not susceptible to magnetic attraction and which is substantially of the same wall thickness, shape and cross-sectional size as the ring 14, is secured to the edge of the ring 14 remote from flange 10 by means of silver solder to form a free end portion of the mounting ring unit consisting of the parts 10, 14 and 16.

The body of the lunette constitutes a ferrous metal tube 20 whose external cross-sectional dimension is slightly less than the interior cross-sectional dimension of the mounting ring 14, 16 so as to accommodate ready insertion thereof in said ring and removal thereof from said ring. The cross-sectional dimension of tube 20 is greater than the size of the opening 12. The tubular body 20 is provided with a narrow substantially flat inturned end wall 22 outlining an opening 24 which preferably is of substantially the same size or diameter as the opening 12 in the flange 10. A retainer ring 26 fits snugly within the tube 20 bearing against the inner surface of the end wall 22 and fixedly secured to wall 22 by securing means 28, such as screws or rivets. The retainer ring 26 preferably has an inner diameter or dimension for the major portion of its length which is greater than the diameter or dimension of the opening 24 and which is interrupted by an inwardly projecting rib 30 spaced from the opposite ends of the retainer ring 26. The rib 30 overlies the marginal portion of a transparent panel 32 having one face bearing against the wall 22 and its opposite face bearing against the rib 30. The retainer ring 26 is formed of ferrous metal and preferably supports a thin ring 34 upon the rib 30 thereof at the face of the rib opposite that which contacts the transparent closure 32. Ring 34 will preferably be formed of sterling silver and serves to support at its margin the unleavened bread wafer 36, which constitutes the Host, at a level or in a plane within the outline of the retainer ring 26 and spaced from the plane of the innermost face of said retainer ring.

The cover or lid of the lunette is preferably substantially cup-shaped and consists of a body preferably formed of sterling silver and having a base 40, a tubular part 42, a substantially flat outturned flange portion 44, and a tubular return bent flange portion 46. The outer diameter of the tubular portion 42 of the lid or cover of the lunette accommodates free fit thereof within the tubular portion 20 of the lunette body, and the axial dimension or depth of the lunette lid is preferably such that the base 40 may bear upon the retainer ring while the flat flange 44 is spaced from the free edge of the tubular body 20 of the lunette holder, as illustrated in Fig. 3. The tubular body 42 of the lid fits in the tubular part 20 of the lunette body with slight clearance to limit permissible eccentricity of the parts and to insure that a space will exist between the outer surface of the lunette body and the inner surface of the flange 46 of the cover when the parts are assembled in Fig. 3, which space is adequate to receive the free end portion of the mounting ring 14, 16, as illustrated in Fig. 1.

The base 40 of the cover of the lunette has suitably secured at its inner surface, as by means of silver soldering, the head 48 of a securing screw having a threaded shank 50 on which is screw-threaded the tubular shank portion 52 of a hand grip member preferably having an enlarged head or grip portion 54. A magnet 56, preferably in the form of a ring, fits within the cup-shaped cover of the lunette encircling the securing screw 48, 50. A retainer plate 58, preferably formed of bronze, fits snugly within the tubular portion 42 of the lunette cover and has a central aperture fitting freely around the shank 50 of the securing screw so that said plate is free to bear against the magnet to hold the same in contact with the cover base 40 when the inner end of the tubular part 52 of the handle bears thereagainst as seen in Figs. 1, 3 and 4.

In the assembled position of the parts illustrated in Fig. 1, the registering openings 12 and 24 spanned by transparent plate 32, when registering with an opening in the body of monstrance (not shown), expose to view the wafer 36 constituting the Host. The various parts of the lunette interfit, as illustrated in Fig. 1, and are held in that interfitting assembled position solely by the magnetic attraction of the magnet 56. The magnet 56 exerts magnetic force upon the tubular body 20 and the retainer ring 26 of the holder portion of the lunette, thereby closing the chamber in which is confined the wafer 36 constituting the Host. The magnet 56 also serves as the means for holding both the tubular body 20 of the lunette and the lunette lid or cover in operative position within the mounting ring 14, 16 of the lunette. In this connection it will be observed that in the assembled relation of the parts, as seen in Fig. 1, the magnet 56 is positioned within the outline of the ferrous metal part 14 of the mounting ring of the lunette.

When it is desired to separate the holder and lid of the lunette as a unit from the mounting ring, as for the purpose of transferring the Host from a monstrance to a tabernacle, only a simple pull upon the handle 54 in an axial direction with respect to the mounting ring 14, 16 is required. As this pull is exerted, it moves the lid or cover of the lunette outwardly in the mounting ring and through the non-ferrous bronze portion 16 of that mounting ring to readily separate the sub-assembly illustrated in Fig. 3 and consisting of the holder and lid of the lunette from the mounting ring. The magnetic force or attraction between the magnet 56 and the ferrous tubular portion 20 and container ring 26 of the holder of the lunette continues during the time that such pull is exerted upon the handle 54, so that there is no tendency of the lid of the lunette to separate from the body of the lunette. Thus the wafer 36, constituting the Host, remains fully confined in the sub-assembly of Fig. 3 so that the sub-assembly is moved from place to place. Nevertheless, separation of the body and lid of the lunette as seen in Fig. 4 can be effected easily by simply exerting a pulling force thereon sufficient to overcome the magnetic attraction between the parts. Assembly of the parts of the lunette can be effected by simply fitting them together properly and relying upon the force of the magnet 56 to hold them together. Thus it is clear that the operations of assembly and of separating the parts of the lunette are simple, rapid and entail minimum manipulation, and in particular it is apparent that the use of mechanical fastening devices, such as latches or pin and slot interlocks, is avoided as is the need to physically or manually manipulate any fastening device incident to assembly of the parts of the lunette or disassembly thereof.

The use of bronze or like material which is not subject to magnetic attraction in the formation of both the flange 10 and the outer mounting ring end part 16 is of great importance to insure that the lid and body of the lunette will remain assembled when a pull is exerted on the handle 54 to remove the holder and lid of the lunette from the mounting ring. It will be observed in this connection that the formation of the flange 10 from bronze substantially eliminates lines of magnetic attraction in the device when assembled as shown in Fig. 1, in a direction transverse of flange 10. Thus the magnetic forces between the magnet and the mounting ring are limited to those extending in substantially radial directions. Such forces are adequate to hold the parts operatively assembled, as illustrated in Fig. 1, when the flange 10 is positioned vertically and the axis of the mounting ring and the parts fitting therein is horizontal, but produces minimum resistance to conjoint bodily movement of the magnet and the body of the lunette when the handle 54 is grasped and pulled. Thus the removable sub-assembly of the lunette is freed from magnetic anchorage within the mounting ring at or before the complete removal of said sub-assembly from the mounting ring.

The provision of the bronze portion 16 of the mounting ring is of equal importance when the sub-assembly illustrated in Fig. 3 is being inserted into the mounting ring, inasmuch as magnetic attraction of the parts does not occur until after the parts have been partially interfitted. Consequently, it is not necessary to use extreme care in the manner in which the sub-assembly is introduced into the mounting ring, and, particularly, it is not essential that exact concentricity of the sub-assembly and the mounting ring be maintained as the sub-assembly is inserted into the ring. Thus the sub-assembly is partially introduced into the mounting ring before any magnetic influence occurs between the sub-assembly and the mounting ring, and at that time the interfitting relation of the parts accommodates guiding of the sub-assembly to proper fully assembled position in the mounting ring, as illustrated in Fig. 1.

While the preferred embodiment of the invention has been illustrated and described herein, it will be understood that changes in the construction may be made within the scope of the appended claims without departing from the spirit of the invention.

I claim:

1. A lunette comprising a hollow holder for a wafer, a lid for said holder, a magnet carried by said lid and fitting within said holder when said lid closes said holder, and a mounting ring freely receiving said holder, said holder and a portion of said mounting ring spaced from the edge of the ring being formed of material susceptible to magnetic attraction.

2. A lunette as defined in claim 1, wherein an end portion of said ring is formed of material not susceptible to magnetic attraction.

3. A lunette comprising a hollow wafer holder having ferrous side and end parts, a lid for said holder having a part fitting freely in said holder, a permanent magnet carried by said last named lid part, and a mounting ring freely receiving said holder and including a ferrous portion and an end portion formed of material not susceptible to magnetic attraction.

4. A lunette comprising a cup-shaped holder having a transparent end portion encircled by a retainer ring formed of material susceptible to magnetic attraction, a cover spanning one end of said holder, a magnet carried by said cover and adapted to be positioned in said holder, and a mounting ring freely receiving said holder and having a ferrous metal part and an end part not susceptible to magnetic attraction.

5. A lunette comprising a cup-shaped holder having an apertured bottom portion, a transparent panel spanning said apertured bottom, a ferrous retainer ring anchoring said panel in said holder and defining a wafer-receiving recess in its inner face, a cup-shaped cover for said holder having a portion nesting in said holder and closing said recess, a magnet mounted within said cover, and a mounting ring receiving said holder and having a ferrous portion and an end portion not susceptible to magnetic attraction, said magnet being positioned in said ferrous mounting ring portion when said holder and cover are nested in said mounting ring.

6. A lunette as defined in claim 1, wherein said mounting ring has an inwardly projecting stop of material not susceptible to magnetic attraction, said stop projecting from the end portion of said mounting ring which is susceptible to magnetic attraction.

7. A lunette as defined in claim 3, wherein said magnet is annular and releasable securing means clamps said magnet in said lid.

8. A lunette as defined in claim 1, and a hand grip carried by said lid.

No references cited.